Patented Oct. 18, 1949

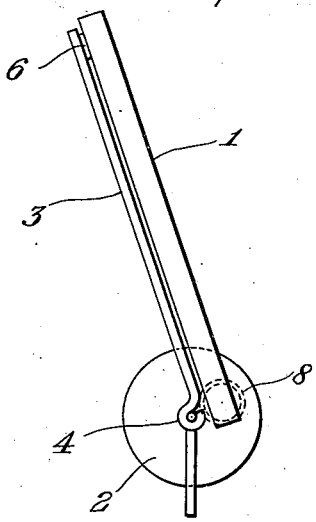
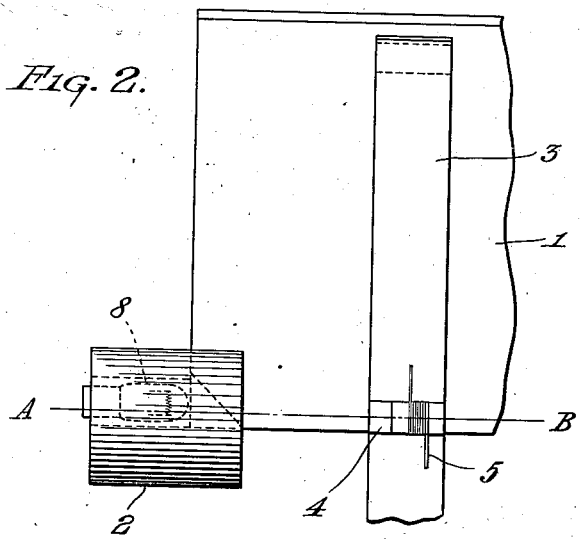
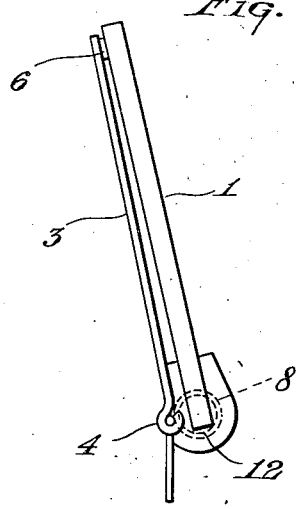
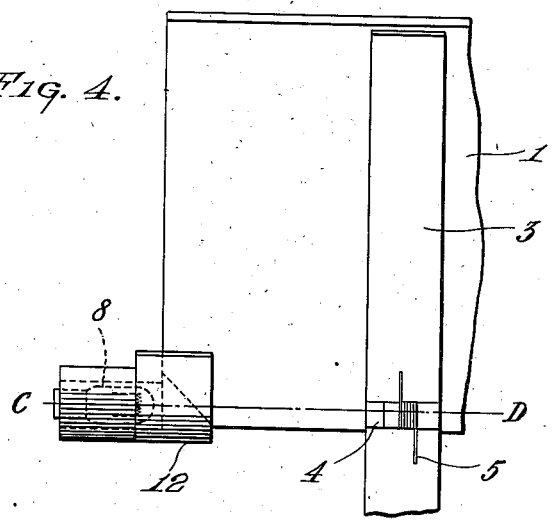
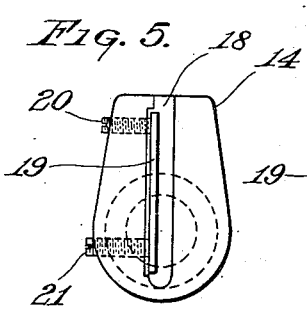
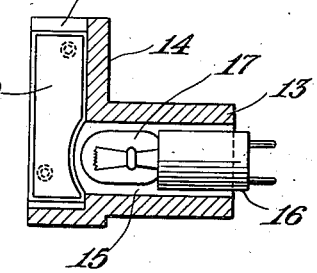
MARTEN JAN GRONENBERG
INVENTOR.
ATTORNEY.

2,485,196

UNITED STATES PATENT OFFICE 2,485,196

INDICATING DEVICE COMPRISING A ROTATABLE SCALE, MORE PARTICULARLY FOR RADIO SETS

Maarten Jan Groenenberg, Eindhoven, Netherlands, assignor, by mesne assignments, to Hartford National Bank and Trust Company, Hartford, Conn., as trustee Application April 23, 1946, Serial No. 664,174
In the Netherlands February 21, 1942

Section 1, Public Law 690, August 8, 1946
Patent expires February 21, 1962

4 Claims. (Cl. 116—124.1)

It has previously been proposed in radio sets to use an indicating device comprising a rotatable scale having the form of a plane glass plate of which the inscriptions are illuminated by lamps placed in the hinges.

The present invention relates to an indicating device of this kind, which will be referred to hereinafter as "swing scale."

When such a scale is used, it is as a matter of fact necessary to utilise such construction of the marking index as permits the latter to follow the movement of the scale. In this case it will usually be necessary to provide the construction of the marking index with a hinge, it being usual to arrange this hinge in the axis of rotation of the scale, so that the axis of rotation of the scale and of the hinge coincide with each other. The advantage is thus obtained that the index can completely follow the movement of the scale.

According to the invention, however, particular constructive advantages are obtained by constructing an indicating device of the said kind in such manner that the axis about which the scale rotates is located in this scale.

According to the invention the fittings for the panel lamps are preferably arranged concentrically with the axis of rotation in the hinges. In one advantageous form of construction of an indicating device according to the invention the scale is journalled on each side in a slot of substantially solid carrier-members which in turn are secured in an articulated manner to the cabinet of the receiver.

A particularly practical construction is obtained if at least one of the sides of a slot is constituted by a loose strip forced against the scale by means of adjusting screws.

In order that the invention may be more clearly understood and readily carried into effect, it will be explained more fully by reference to the accompanying drawing.

Figs. 1 and 2 are views of a swing scale of the above-mentioned construction.

Figs. 3 and 4 are views of a swing scale according to the invention.

Figs. 5 and 6 show an advantageous form of construction of a scale hinge according to the invention.

Figs. 1 and 2 show a scale having the form of a plane glass plate 1 which is journalled in a hinge 2 so that the scale can rotate about the axis AB.

A marking index 3 comprising a hinge moves along the back of the scale. The indicating part proper is steadily forced against the scale 1 by means of a spiral spring 5. A piece of felt 6 serves to avoid scratches when the marking index moves along the scale.

At the place of the dotted line 8 the hinge contains a lamp which serves in known manner for the illumination of the scale, since the light rays are reflected on all sides of the glass plate and consequently remain invisible except at the places where the inscriptions are made on the scale.

Due to the axis of the hinge being located in the axis AB about which the scale is rotatable, the index will always be able to follow exactly the movement of the scale.

Due to the finite thickness of the scale and that of the hinge, however, the axis of rotation cannot in this case extend through the scale, so that on rotating the latter the bottom describes a circular path.

It is evident that the illumination lamp which is located at the place of 8 has to follow this movement of the bottom of the scale, so that on rotating the scale the supply wires are subject to rather considerable movements.

Consequently, the chance of rupture of the connections will lastly be rather great, unless use is made of very flexible cord which involves additional cost.

Moreover, the whole hingeable construction becomes rather voluminous and consequently expensive, since the scale has to be secured in it excentrically.

In the form or construction according to the invention shown in Figs. 3, 4, 5 and 6, all these drawbacks are obviated.

As can be seen from Fig. 3, the axis of rotation CD is in this case located in the scale, the axis of the hinge 4 necessarily not coinciding with the axis CD.

According to the invention, this construction permits the illumination lamp 8 to be placed in the axis of rotation, due to which the movements of the supply wires are greatly reduced and the illumination lamp may even be caused not to follow the movement of the scale. Moreover, the whole hingeable construction may be much smaller and consequently considerably less expensive than can be the case in the known construction shown in Figs. 1 and 2.

The construction of the marking index may be made as shown in Figs. 3 and 4, that is such that in the most lowered position of the scale the index engages wholly in parallel with the scale, whereas in any other position the index forms a certain angle with the surface of the scale and engages the latter only in the point determined by the piece of felt 6. When the scale is rotated the marking index will be displaced over a certain distance in its longitudinal direction relatively to the scale, while the space between the index and the scale at the bottom is not constant, but these changes are so small as to be in general negligible.

In order to ensure in a simple manner that the axis of rotation is located in the scale, it is possible according to the invention to journal the scale on each side in slots of substantially solid carrier-members which are secured in an articulated manner to the cabinet of the receiver in such a manner that their axis of rotation extends through the slots and hence through the scale.

One form of construction of a hinge thus constructed and in which the scale may be exchanged in a simple manner is shown in Figs. 5 and 6 in side-view and in a section respectively. According to the invention, in this case one of the sides of the slot is constituted by a loose strip which may be forced against the scale by means of adjusting screws. The hinge 12 comprises a cylindrical part 13 which can rotate in a space of the cabinet surrounding this part, as well as a part 14 which serves as a scale holder. The cylindrical part 13 has recessed in it an opening 15 which is also cylindrical and in which the fitting 16 for an illumination lamp 17 may be housed. The part 14 has recessed in it a slot 18 in which the glass scale may be journalled. For fastening this scale a strip 19 is provided which may be forced against the scale by means of adjusting screws 20, 21.

In this manner the scale may be very easily exchanged if this would be necessary for some reason or other.

I claim:

1. Indicating apparatus comprising a pair of carrier members each provided with a rotatable bushing portion, said members being arranged in spaced relation and with the bushing portions thereof in axial alignment, a transparent plate-shaped dial mounted between said bushing portions for rotary motion therewith about the common axis of said bushing portions, said axis extending within said dial, a pair of illuminating lamps for said dial each coaxially positioned within a respective bushing portion, and a pointer arranged for movement along said dial.

2. Indicating apparatus comprising a pair of carrier members each provided with a rotatable bushing portion having a slot therein, said members being arranged in spaced relation and with the bushing portions thereof in horizontal axial alignment, a transparent rectangular dial mounted between said bushing portions for rotary motion therewith about the common axis of said bushing portions, the lower end portions of said dial being received in the slots of said bushing portions so that said axis extends longitudinally within said dial, a pair of illuminating lamps for said dial each coaxially positioned within a respective bushing portion, and a pointer arranged for movement along said dial.

3. Tuning apparatus for a radio housed in a cabinet, said apparatus comprising a pair of carrier members provided with a rotatable bushing portion having a slot therein, said members being mounted on top of the cabinet in spaced relation and with the bushing portions thereof in horizontal axial alignment, a transparent rectangular dial mounted between said bushing portions for rotary motion therewith about the common axis of said portions, the lower end portions of said dial being received in the slots of said bushing portions so that said axis extends longitudinally within said dial, a pair of illuminating lamps for said dial each coaxially positioned within a respective bushing portion, and a pointer arranged for movement along said dial.

4. Tuning apparatus for a radio housed in a cabinet, said apparatus comprising a pair of carrier members provided with a rotatable bushing portion having a slot therein, said members being mounted on top of the cabinet in spaced relation and with the bushing portions thereof in horizintal axial alignment, a transparent rectangular dial mounted between said bushing portions for rotary motion therewith about the common axis of said portions, the lower end portions of said dial being received in the slots of said bushing portions so that said axis extends longitudinally within said dial, adjustable compression means for securing said dial within the slots of said bushing portions, a pair of illuminating lamps for said dial each concentrically positioned within a respective bushing portion, and a pointer arranged for movement along said dial.

MAARTEN JAN GROENENBERG.

REFERENCES CITED

The following references are of record in the file of this patent:

FOREIGN PATENTS

| Number | Country | Date |
| --- | --- | --- |
| 173,557 | Switzerland | Nov. 30, 1934 |
| 340,708 | Italy | June 20, 1936 |
| 376,090 | Italy | Oct. 31, 1939 |
| 428,461 | Great Britain | May 9, 1935 |
| 43,791 | France | May 24, 1933 |

Addition to No. 758,312.